United States Patent [19]

Kanjo

[11] Patent Number: 4,683,991
[45] Date of Patent: Aug. 4, 1987

[54] ACTUATING MEANS FOR A SLACK ADJUSTER OVERTRAVEL CONTROL MECHANISM

[75] Inventor: Wajih Kanjo, Midlothian, Ill.

[73] Assignee: American Standard Inc., Chicago, Ill.

[21] Appl. No.: 711,553

[22] Filed: Mar. 14, 1985

[51] Int. Cl.⁴ .................................... F16D 65/40
[52] U.S. Cl. ........................................... 188/197
[58] Field of Search ............... 188/197, 198, 202, 203, 188/146 D, 72.7, 74, 265, 1.12, 300; 192/111 A

[56] References Cited

U.S. PATENT DOCUMENTS

| | | | |
|---|---|---|---|
| 586,745 | 7/1897 | Pierce et al. | 188/74 |
| 1,786,299 | 12/1930 | Hancock | 188/202 X |
| 2,084,989 | 6/1937 | Browall | 188/198 X |
| 2,998,104 | 8/1961 | McClare et al. | 188/202 X |

FOREIGN PATENT DOCUMENTS 1287276  1/1969  Fed. Rep. of Germany ...... 188/300

*Primary Examiner*—Duane A. Reger
*Attorney, Agent, or Firm*—J. O. Ray, Jr.

[57] ABSTRACT

A trigger mechanism is taught which actuates an overtravel control apparatus of a slack adjuster in a railway vehicle brake rigging in response to the measured travel distance of a brake cylinder piston rod. The triggering mechanism includes an elongated hollow member secured to one end of the slack adjuster housing. An abutment surface carried by an extension member secured to one end of the overtravel control apparatus which moves reciprocally within the hollow member. A pivotal connection is secured adjacent an aperture formed in the wall of the hollow member. A lever device is pivotally connected to such pivotal connection and positioned to engage at one end thereof the abutment surface and having the other end movable in response to the brake cylinder piston rod travel distance.

3 Claims, 4 Drawing Figures

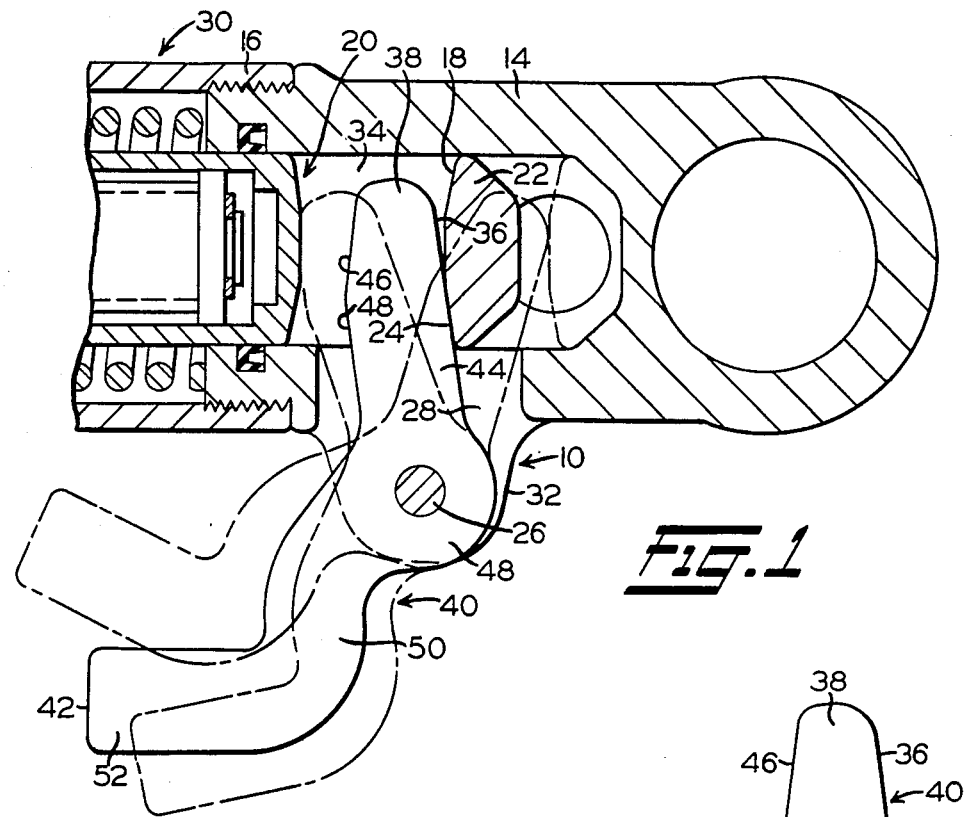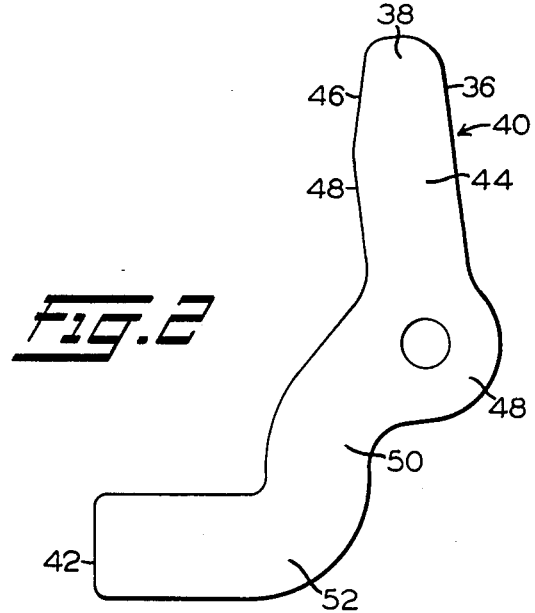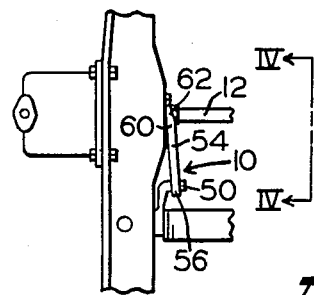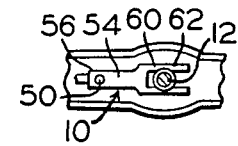

ACTUATING MEANS FOR A SLACK ADJUSTER OVERTRAVEL CONTROL MECHANISM

BACKGROUND OF THE INVENTION

The present invention relates in general to railway vehicle brake rigging slack adjuster assemblies and, more particularly, the invention relates to a triggering mechanism that activates the overtravel control apparatus of the slack adjuster in response to a measured travel distance of a fluid-pressure-operated brake cylinder piston rod.

For a number of years, slack adjusters have been provided as part of the brake rigging of railway vehicles to automatically compensate for the slack present in such brake rigging. This slack adjustment of the brake rigging is important for a variety of reasons. At least one significant reason is that with proper brake rigging movement, the brake cylinder piston rod travel distance can be maintained within a preselected travel distance.

In order for the slack adjuster assembly to adjust the slack in the brake rigging, an overtravel control mechanism is provided which is triggered in response to a measured and preset travel distance of the brake cylinder piston rod. In many installations, and particularly where the brake rigging is mounted on the trucks, the trigger placement becomes significantly more critical because of the limited space available to mount such trigger. Nevertheless, the number of such railway cars having truckmounted brake rigging is increasing because the slack adjuster assembly can be used as a force-transmitting member, thereby replacing one of the brake cylinders previously required.

Use of a slack adjuster assembly in this manner, therefore, offers the advantages of lower cost and reduced vehicle weight. On the other hand, this use requires that such slack adjuster assemblies have greater reliability. Further adding to the importance of maintaining a properly balanced brake rigging slack, is the fact that in normal practice, today's trains are made up with a greater number of cars which has been made possible because of increased power in the locomotive equipment.

SUMMARY OF THE INVENTION

The present invention teaches a triggering mechanism which actuates, in response to a measured travel distance of a brake cylinder piston rod, an overtravel control apparatus in a railway vehicle brake rigging slack adjuster assembly. The triggering mechanism comprises an elongated hollow member secured at one end thereof to one end of the housing of the slack adjuster assembly. An abutment surface that is carried by an extension member, secured to one end of the overtravel control apparatus, is positioned to reciprocally move longitudinally in the hollow member. A pivotal connection is secured to the hollow member adjacent an aperture formed through the wall of the hollow member. A lever means is pivotally connected to the pivotal connection and positioned such that, one end thereof is engageable with the abutment surface and the other end thereof moves in response to a predetermined travel distance of such brake cylinder piston rod, thereby triggering such overtravel control apparatus when the end of the lever engaging the abutment surface moves the abutment surface in a first longitudinal direction thereby adjusting the slack in such brake rigging.

OBJECTS OF THE INVENTION

It is, therefore, one of the primary objects of the present invention to provide a trigger mechanism for the overtravel control apparatus of a railway vehicle brake rigging slack adjuster assembly that requires significantly less space for installation.

Another object of the present invention is to provide a trigger mechanism for the overtravel control apparatus of a railway vehicle brake rigging slack adjuster assembly that can be mounted in a number of locations.

Still another object of the present invention is to provide a trigger mechanism for the overtravel control apparatus of a railway vehicle brake rigging slack adjuster assembly that requires fewer parts.

These and various other objects and advantages of the present invention will become more apparent to those persons skilled in the railway vehicle brake rigging slack adjuster art from the following more detailed description when such description is taken in conjunction with the attached drawing figures and the appended claims.

BRIEF DESCRIPTION OF THE DRAWINGS

FIG. 1 is a plan view, partially in cross-section, showing the trigger mechanism of a presently preferred embodiment of the invention;

FIG. 2 is a plan view of a presently preferred lever means used in the trigger mechanism of the present invention shown in FIG. 1;

FIG. 3 is a plan view of one form of a slack adjuster installation in a railway vehicle brake rigging incorporating the trigger mechanism; and FIG. 4 is an end view taken along lines IV—IV of FIG. 3.

BRIEF DESCRIPTION OF THE INVENTION

When referring to the drawing figures, identical parts have been identified with like numerals.

Now refer more particularly to the drawings which show a presently preferred embodiment of the invention. As shown in the drawings, a triggering mechanism, generally designated 10, actuates an overtravel control apparatus, generally designated 20, in a slack adjuster assembly, generally designated 30, connected into a railway vehicle brake rigging. The trigger mechanism 10 actuates the overtravel control apparatus 20 in response to a measured travel distance of a brake cylinder piston rod 12 (FIG. 3).

The triggering mechanism 10 comprises an elongated hollow member 14 secured at one end thereof to one end of the housing 16 of such slack adjuster assembly 30. An abutment surface 18, carried by an extension member 22 secured at one end of the overtravel control apparatus 20, is positioned to reciprocally move longitudinally in the hollow member 14. The abutment surface 18 in the presently preferred embodiment of the invention has a convex shape 24. The abutment surface 18 is according to the presently preferred practice of the invention carried by the extension member 22 and is formed by an aperture 34 extending through the extension member 22.

A pivotal connection 26 is secured to the hollow member 14 adjacent an aperture 28 formed through a wall of the hollow member 14. In the presently preferred embodiment of the invention, the pivotal connection 26 includes two ears 32 which extend outwardly from the outer surface of the hollow member 14 and are cast as a single piece with the hollow member 14.

A lever means, generally designated 40, is pivotally connected to the pivotal connection 26 and is positioned such that, a surface 36 positioned at one end 38 thereof is engageable with the abutment surface 18 and the other end 42 of lever 40 moves in response to a predetermined travel distance of such brake cylinder piston rod 12. The lever 40 triggers the overtravel control apparatus 20 when the end 38 of the lever 40 engaging the abutment surface 18 moves the abutment surface 18 in a first longitudinal direction and thereby adjusting the slack in such brake rigging.

As best shown in FIG. 2, the lever means 40 comprises a first elongated arm portion 44 which carries the abutment surface 36 adjacent the end 38 thereof for engagement with the abutment surface 18 carried by the extension member 22 of the overtravel control apparatus 20. The first arm portion 44 includes, in the presently preferred embodiment, a tapered portion 46 opposite the abutment surface 36. The tapered portion 46 provides a requisite amount of brake cylinder piston rod 12 travel prior to triggering the slack adjuster assembly 30. The tapered portion 46 has a taper of at least about 15 degrees with respect to an arm surface 48 opposite the abutment surface 36 on the first arm portion 44. The lever means 40 also includes a pivot portion 48 connected to the other end of the first arm portion 44 for making the pivotal connection of the lever means 40 to the pivotal connection 26. A second elongated arm portion 50 of the lever means 40 is connected at one end thereof to the pivot portion 48 and extends outwardly from the slack adjuster housing 16 and toward the other end of the overtravel control apparatus 20. A third elongated arm portion 52 of the lever means 40 is connected at one end thereof to the other end of the second arm portion 50 and extends toward the other end of the overtravel control apparatus 20 and substantially parallel with the slack adjuster housing 16. According to the presently preferred practice of this invention, the first arm portion 44, the pivot portion 48, the second arm portion 50, and the third arm portion 52 are formed as a single piece.

The lever means 40 further includes a connecting arm 54 (FIG. 3) connected at one end 56 thereof adjacent the other end 58 of the third arm portion 52 and at the other end 60 thereof to engage such brake cylinder piston rod 12 to trigger the overtravel control apparatus 20. The end 60 of connecting arm 54, according to the presently preferred embodiment, includes a forked portion having arms 62.

Although the preferred and various alternative embodiments have been shown, it will be obvious to those skilled in the slack adjuster design art that various other modifications can be made to the invention without departing from the spirit and scope of the attached claims.

I claim:

1. A triggering mechanism, which actuates in response to a measured travel distance of a brake cylinder piston rod, an overtravel control apparatus in a railway vehicle brake rigging slack adjuster assembly, said triggering mechanism comprising:
   (a) an elongated hollow member secured at one end thereof to one end of a housing of such slack adjuster assembly;
   (b) an abutment surface having a convex shape carried by an extension member secured to one end of such overtravel control apparatus and positioned to reciprocally move longitudinally in said hollow member, said abutment surface formed by an aperture extending through said extension member;
   (c) a pivotal connection secured to said hollow member adjacent an aperture formed through a wall of said hollow member;
   (d) a lever means pivotally connected to said pivotal connection and positioned such that one end thereof is engageable with said abutment surface and an opposite end thereof moves in response to a predetermined travel distance of such brake cylinder piston rod for triggering such overtravel control apparatus when said one end of said lever means engaging said abutment surface moves said abutment surface in a first longitudinal direction, said lever means including:
      (i) a first elongated arm portion carrying an abutment surface adjacent one end thereof, said first arm portion including a tapered portion having a taper of at least about 15 degrees with respect to an arm surface opposite said abutment surface, said abutment surface engaging said convex shape of said abutment surface carried by said overtravel control extension member,
      (ii) a pivot portion connected to an opposite end of said first arm portion for pivotally connecting said lever means to said pivotal connection,
      (iii) a second elongated arm portion connected at one end thereof to said pivot portion and extending outwardly from said slack adjuster housing and toward an opposite end of said overtravel control apparatus, and
      (iv) a third elongated arm portion connected at one end thereof to an opposite end of said second arm portion and extending toward said opposite end of said overtravel control apparatus and substantially parallel with said slack adjuster housing;
   (e) a connecting arm connected at one end thereof to said opposite end of said lever means and having a forked portion at an opposite end thereof engageable with said brake cylinder piston rod when said brake cylinder piston rod moves a preselected distance thereby triggering such overtravel control apparatus to adjust slack in such brake rigging.

2. A slack adjuster overtravel control triggering mechanism, according to claim 1, wherein said first arm portion, said pivot portion, said second arm portion, and said third arm portion are formed as a single piece.

3. A slack adjuster overtravel control triggering mechanism, according to claim 2, wherein said pivotal connection includes two ears which extend outwardly from an outer surface of said hollow member and are cast as a single piece with said hollow member.

* * * * *